(12) United States Patent
Inagaki

(10) Patent No.: US 12,491,825 B2
(45) Date of Patent: Dec. 9, 2025

(54) SOUND-ABSORBING MATERIALS, VEHICLE EXTERIOR MEMBER USING SAME, AND METHOD OF MANUFACTURING SAME

(71) Applicant: Howa Co., Ltd., Aichi-ken (JP)

(72) Inventor: Yuichiro Inagaki, Aichi-ken (JP)

(73) Assignee: Howa Co., Ltd., Kasugai (JP)

( * ) Notice: Subject to any disclaimer, the term of this patent is extended or adjusted under 35 U.S.C. 154(b) by 324 days.

(21) Appl. No.: 18/021,162

(22) PCT Filed: Jan. 31, 2022

(86) PCT No.: PCT/JP2022/003508
§ 371 (c)(1),
(2) Date: Feb. 13, 2023

(87) PCT Pub. No.: WO2022/219880
PCT Pub. Date: Oct. 20, 2022

(65) Prior Publication Data
US 2023/0219505 A1     Jul. 13, 2023

(30) Foreign Application Priority Data
Apr. 16, 2021   (JP) ................... 2021-069654

(51) Int. Cl.
*B60R 13/08* (2006.01)
*D04H 1/559* (2012.01)

(52) U.S. Cl.
CPC ............ *B60R 13/08* (2013.01); *D04H 1/559* (2013.01)

(58) Field of Classification Search
CPC . B60R 13/0861; B60R 13/08; B60R 13/0815; G10K 11/168; B29C 43/021; D04H 1/559; B32B 5/26
See application file for complete search history.

(56) References Cited

U.S. PATENT DOCUMENTS

| | | | | |
|---|---|---|---|---|
| 2,434,527 A | * | 1/1948 | Untiedt | B29C 35/02 156/220 |
| 3,094,716 A | * | 6/1963 | Friedman | A47C 27/22 29/91.1 |

(Continued)

FOREIGN PATENT DOCUMENTS

| | | |
|---|---|---|
| JP | H11-327566 A | 11/1999 |
| JP | 2013-006292 A | 1/2013 |

(Continued)

OTHER PUBLICATIONS

International Preliminary Report on Patentability from PCT Application No. PCT/JP2022/003508, dated Oct. 26, 2023, 5 pgs.

(Continued)

*Primary Examiner* — Forrest M Phillips
*Assistant Examiner* — Joseph James Peter Illicete
(74) *Attorney, Agent, or Firm* — Husch Blackwell LLC

(57) ABSTRACT

A sound-absorbing material attached to a vehicle exterior member which comprises an intermediate layer having a fiber web of entangled thermoplastic synthetic fibers, and a skin layer having a nonwoven fabric containing thermoplastic synthetic fibers, the layers being laminated with each other. A peripheral edge portion is heat-compressed in a state where the intermediate layer and the skin layer are layered. A crimped portion is heat-compressed in the thickness direction. A plurality of the crimped portions are provided on at least a part of the surface of the intermediate layer laminated with the skin layer and positioned within the peripheral edge portion. A sound-absorbing portion is a portion in which the intermediate layer and the skin layer are laminated in a state where the fiber web is compressed thinner than its natural thickness by the crimped portions.

10 Claims, 3 Drawing Sheets

(56) References Cited

U.S. PATENT DOCUMENTS

| | | | | |
|---|---|---|---|---|
| 3,471,354 | A | * | 10/1969 | Scofield .................. B32B 27/00 |
| | | | | 118/44 |
| 4,561,917 | A | * | 12/1985 | Urai ...................... B29C 59/026 |
| | | | | 156/290 |
| 4,627,664 | A | * | 12/1986 | Okazaki ............. B29D 99/0092 |
| | | | | 297/452.61 |
| 4,781,710 | A | * | 11/1988 | Megison .................. A61F 13/47 |
| | | | | 604/385.101 |
| 4,867,826 | A | * | 9/1989 | Wayte ....................... B32B 7/12 |
| | | | | 156/219 |
| 5,841,081 | A | * | 11/1998 | Thompson ............... D04H 1/56 |
| | | | | 181/290 |
| 10,619,276 | B2 | * | 4/2020 | Kurashima ............. B32B 25/08 |
| 11,267,190 | B2 | * | 3/2022 | Yamane ............... B29C 33/405 |
| 2020/0122651 | A1 | * | 4/2020 | Delpero .............. B60R 13/0815 |
| 2020/0331252 | A1 | * | 10/2020 | Yamane .................. B32B 5/026 |

FOREIGN PATENT DOCUMENTS

| | | |
|---|---|---|
| JP | 2015-212442 A | 11/2015 |
| JP | 2017-213865 A | 12/2017 |
| JP | 2019-072867 A | 5/2019 |
| JP | 2019-127259 A | 8/2019 |
| JP | 2020-176341 A | 10/2020 |

OTHER PUBLICATIONS

International Search Report and Written Opinion for PCT/JP2022/003508, mailed Mar. 29, 2022, 8 pages.

* cited by examiner

SOUND-ABSORBING MATERIALS, VEHICLE EXTERIOR MEMBER USING SAME, AND METHOD OF MANUFACTURING SAME

CROSS-REFERENCE TO RELATED APPLICATIONS

The present application is a U.S. National Phase entry of, and claims priority to, PCT Application PCT/JP2022/003508, filed Jan. 31, 2022, which claims priority to Japanese Patent Application No. 2021-069654, filed Apr. 16, 2021, both of which are incorporated herein by reference in their entireties for all purposes.

BACKGROUND

The present disclosure relates to a sound-absorbing material, vehicle exterior member using same, and method of manufacturing same.

Conventionally, a sound-absorbing material has been attached to various parts of vehicles, such as automobile interior trims, fender liners, and body undercovers, for the purpose of quieting the passenger compartment. Soft materials, such as a mixture of polyester fibers and melt-blown fibers made of polypropylene, which are laminated with spun-bonded fiber, or other suitable materials, may be used as the sound-absorbing material. For example, in Japanese Unexamined Patent Publication No. 2015-212442, a nonwoven fiber web, which is a mixture of melt-blown fibers (long fibers) and binder fibers (short fibers), is described as a sound-absorbing material for vehicle exterior member (for example, a fender liner).

Generally, the sound-absorbing performance of the sound-absorbing material may be improved by increasing the thickness of the sound-absorbing material. However, depending on the part of the vehicle exterior member where the sound-absorbing material is to be attached, it may be necessary to reduce its thickness. For example, when attaching the sound-absorbing material on an engine undercover, it is required to maintain a certain distance between the sound-absorbing material and the heat source in order to prevent interference therebetween. Therefore, the part of the sound-absorbing material close to the heat source is typically notched out, or another thin sound-absorbing material is attached to this part. However, when a part of the sound-absorbing material is notched out, the area of the sound-absorbing material becomes smaller. This leads to a concern that the sound-absorbing performance would decline. In addition, when multiple sound-absorbing materials of different thicknesses are attached to a single vehicle exterior member, the manufacturing process requires more man-hours.

Therefore, there is a need for improved sound-absorbing materials, vehicle exterior member using same, and method of manufacturing same.

SUMMARY

A first aspect of the present disclosure is a sound-absorbing material attached to a vehicle exterior member which may include an intermediate layer, a skin layer, a peripheral edge portion, a crimped portion, and a sound-absorbing portion. The intermediate layer may be a fiber web of entangled thermoplastic synthetic fibers and may have a sheet-shape. The skin layer is a planar nonwoven fabric containing thermoplastic synthetic fibers laminated with at least one surface of the intermediate layer. The peripheral edge portion is heat-compress bonded in a state where the intermediate layer and the skin layer are layered and compressed in the thickness direction along the peripheral edge. A plurality of the crimped portions are provided on at least a part of the surface of the intermediate layer laminated with the skin layer and provided within the peripheral edge portion. The intermediate layer and the skin layer are heated in a compressed state in the thickness direction to form the crimped portions. In the sound-absorbing portion, the intermediate layer and the skin layer are laminated in a state where the fiber web is compressed to a thickness thinner than its natural thickness by the crimped portion.

According to the first aspect, the sound-absorbing material includes both the intermediate layer, which is the fiber web, and the skin layer, which is a planar non-woven fabric. The skin layer and the intermediate layer may contain thermoplastic synthetic fibers, which are heated in a compressed state in the thickness direction to form the peripheral edge portion and the crimped portion. A plurality of the crimped portions are provided on at least a part of the surface of the intermediate layer laminated with the skin layer and within the peripheral edge portion. Therefore, the skin layer around the crimped portion is pulled by the crimped portion, which in turn presses the fiber web of the intermediate layer. As a result, the sound-absorbing portion is a portion in which the fiber web is compressed thinner than its original thickness. This is especially seen in the area where the crimped portions are provided. Therefore, the thickness of some areas of a single sound-absorbing material, for instance areas where there is need to prevent the sound-absorbing material from interference with surrounding parts, can be made thinner. Further, the basis weight (weight per unit area) of the sound-absorbing material in the sound-absorbing portion is greater than a situation in which a low basis weight sound-absorbing material that has a thin natural thickness that is not compressed is used. Therefore, it is possible to suppress a decline in the sound absorption performance of the sound-absorbing material.

DETAILED DESCRIPTION

Figure 1:
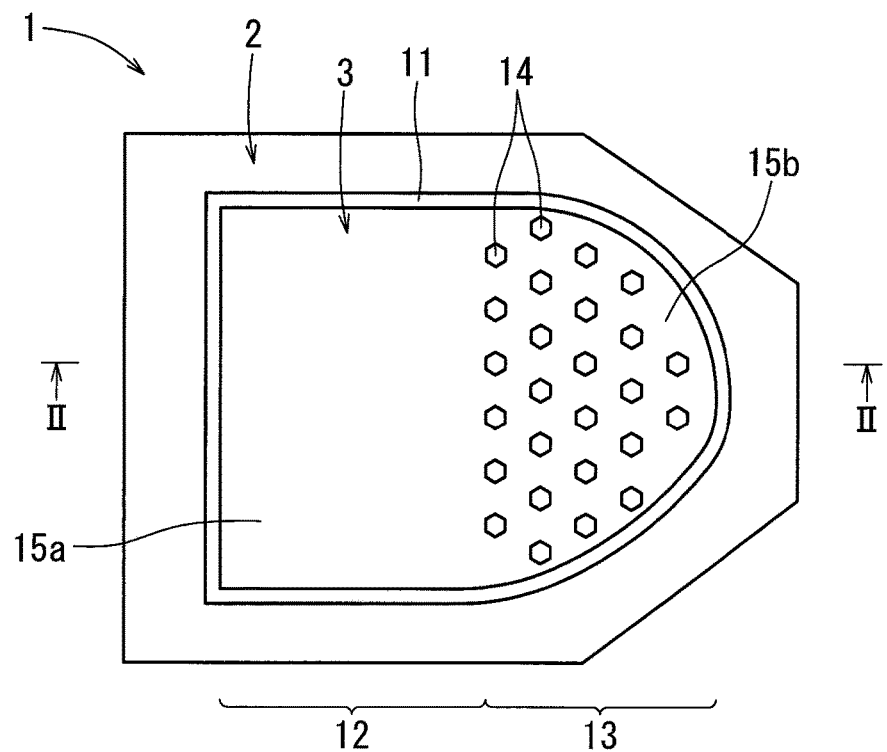
FIG. 1 is a plan view schematically showing a sound-absorbing material and a vehicle exterior member using the sound-absorbing material according to an embodiment.

Hereinafter, embodiments of the present disclosure will be described with reference to FIGS. 1 to 5. As an example of a sound-absorbing material and of a vehicle exterior member using the sound-absorbing material according to the present embodiment, an undercover 1 for a vehicle will be described. The aerodynamic performance of the underside of the vehicle body, protection of the vehicle, and sound absorption performance may be improved by attaching the undercover 1. For example, an engine undercover may be attached to the underside of a vehicle body to cover the underside of the engine to protect the engine from flying rocks and other foreign objects during driving. A floor undercover is attached to the underside of the vehicle body to cover the underside of the vehicle body so as to protect the vehicle body and its components. As shown in FIG. 1, the undercover 1 (which is an embodiment of a vehicle exterior member) of the present embodiment has a fiber base material 2 containing a thermoplastic synthetic resin and a sound-absorbing material 3 attached to one side of the fiber base material 2, i.e., the vehicle body side.

Figure 2:
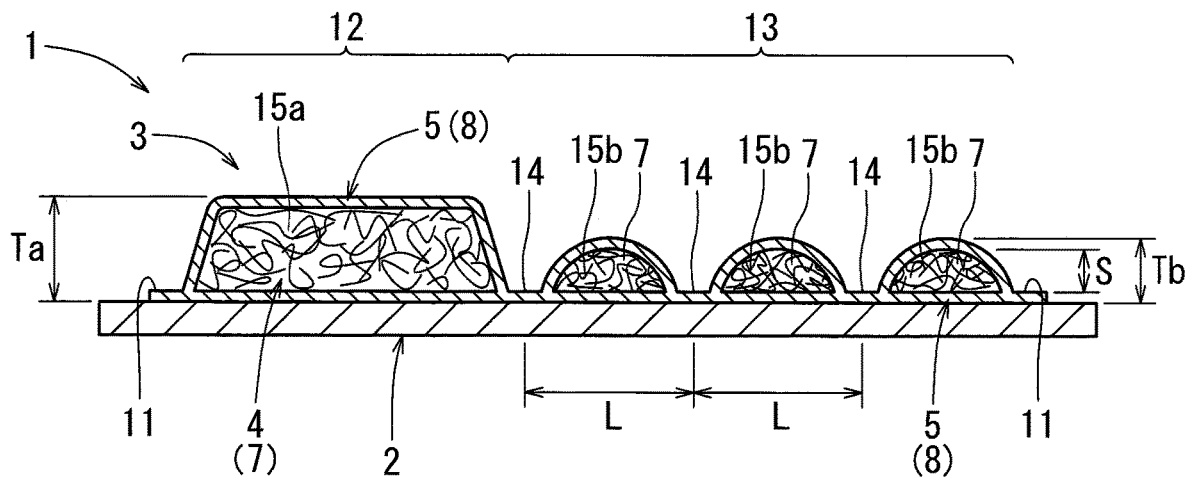
FIG. 2 is a cross-sectional view of the vehicle exterior member using the sound-absorbing material of FIG. 1 taken along the line II-II of FIG. 1.

As shown in FIGS. 2, the sound-absorbing material 3 may have an intermediate layer 4 and a skin layer 5 layered on both sides of the intermediate layer 4. The intermediate layer 4 may be a fiber web 7 containing entangled thermoplastic synthetic fibers and may have a sheet-shape. The skin layer 5 may be a nonwoven fabric 8 containing thermoplastic synthetic fibers and may have a sheet-shape.

The thermoplastic synthetic fibers in the fiber web 7 of the intermediate layer 4 and the thermoplastic synthetic fibers in the nonwoven fabric 8 of the skin layer 5 may be selected from the group consisting of polyethylene fibers, polypropylene fibers, polystyrene fibers, polyester fibers, and mixtures thereof. The fiber web 7 is, for example, a melt-blown nonwoven fabric made from polypropylene fibers or a felt made from polyester fibers. Thinsulate (Registered Trademark) may be used as the fiber web 7. Polypropylene fibers are preferred because their hydrophobic properties prevent water from penetrating between the fibers and because they maintain sound-absorbing properties in use.

The intermediate layer 4 has better sound absorption properties when a dense and thick fiber web 7 is used. The density and thickness of the fiber web 7 are set appropriately according to the area where it is attached to the vehicle. The thermoplastic synthetic fibers used as the fiber web 7 may be selected as appropriate for fiber diameter and length. The skin layer 5 protects the fiber web 7 of the intermediate layer 4. For example, a spun-bond made from polypropylene is used as the nonwoven fabric 8 of the skin layer 5. The skin layer 5 may be layered only on one side of the intermediate layer 4, i.e., the side opposite to the side in contact with the fiber base material 2.

The surface of the intermediate layer 4 laminated with the skin layer 5 may have a peripheral edge portion 11 that is heat-compressed in the thickness direction along the peripheral edge thereof. The peripheral edge portion 11 may have reduced fraying and peeling at the edges of the intermediate layer 4 and skin layer 5, and may have a reduced intrusion of dust, sand, and/or water. Further, sound-absorbing material 3 may include a natural thickness area 12 and a thickness suppression area 13. Here, the natural thickness refers to the thickness of the fiber web 7 when it is placed on a flat surface with no external force being exerted in the thickness direction. The natural thickness area 12 has a sound-absorbing portion 15$a$ in which the fiber web 7 of the intermediate layer 4 is maintained at its natural thickness substantially over the area thereof. The thickness suppression area 13 is provided in at least a part of an area where it is necessary to prevent interference with peripheral components to the undercover 1. The thickness Tb of the sound-absorbing material 3 in the thickness suppression area 13 is thinner than the natural thickness area 12.

The thickness suppression area 13 may have a crimped portion 14 and a sound-absorbing portion 15$b$. A plurality of crimped portions 14 are provided at a constant interval (L) so that they are scattered about the surface of the intermediate layer 4 laminated with the skin layer 5. The arrangement pattern of the crimped portions 14 in the thickness suppression area 13 may be set based on the intended use. For example, crimped portions 14 may be arranged adjacent to each other so that they are arranged at the vertices of a triangle. For example, the shape of the crimped portion 14 may be hexagonal, but other shapes are also acceptable. The crimped portion 14 is a heat-compressed portion in which the intermediate layer 4 and the skin layer 5 are heat compressed in the thickness direction. Specifically, a part of the thermoplastic synthetic fibers contained in the fiber web 7 of the intermediate layer 4 and the nonwoven fabric 8 of the skin layer 5 are thermally melted. Thereby, the intermediate layer 4 and skin layer 5 are integrally solidified in a crimped state. Therefore, the crimped portion 14 is thinned to the extent that it does not have the same thickness as the intermediate layer 4.

In the sound-absorbing portion 15$b$ of the thickness suppressing area 13, the intermediate layer 4 and the skin layer 5 are laminated in a state where the fiber web 7 is compressed thinner than the natural thickness of the fiber web 7. This is accomplished by the crimped portion 14. Specifically, the skin layer 5 around the crimped portion 14 is pulled by the crimped portion 14, so that the fiber web 7 of the intermediate layer 4 is pressed by the skin layer 5. As a result, the sound-absorbing portion 15$b$ in the area in which the sound-absorbing material 3 is compressed thinner than the thickness of the natural thickness area 12 (Ta) in the thickness suppressing area 13, the thickness suppression area 13 being provided with the crimped portion 14. Further, along the surface of the intermediate layer 4 laminated with the skin layer 5, the crimped portions 14 are dispersed and arranged at a constant interval L. Therefore, the force that the skin layer 5 presses the fiber web 7 between each crimped portion 14 is also constant. The maximum thickness of the fiber web 7 (S) in the thickness suppression area 13 is therefore constant. As a result, the thicknesses of the sound-absorbing portions 15$b$ are uniformed and any unevenness of the thickness of the sound-absorbing material 3 (Tb) in the thickness suppression area 13 may be reduced.

In the sound-absorbing material 3, the basis weight (weight per unit area) of the sound-absorbing portion 15$b$ in the thickness suppressing area 13 is greater than the conventional case where a thin, uncompressed sound-absorbing material is used. Therefore, deterioration of the sound-absorbing performance of the sound-absorbing material 3 may be suppressed. For example, a thin sound-absorbing material having a basis weight lower than that of a sound-absorbing material having a natural thickness of 27 mm and having a natural thickness of 13 mm has a relatively low sound-absorbing performance. On the other hand, when the natural thickness of the entire sound-absorbing material 3 is 27 mm and the thickness of the thickness suppression area 13 (Tb) is set to 13 mm, the fiber web 7 of the intermediate layer 4 is compressed in the sound-absorbing area 15$b$ while the basis weight is maintained. Thereby, the space between the fibers becomes small. By forming the sound-absorbing portion 15$b$ of the thickness suppression area 13 by compressing the bulk of the fiber web 7 in this way, the sound-absorbing material 3 has a better sound-absorbing performance than the case where a thinner portion of a sound-absorbing material with a thinner natural thickness and a smaller basis weight is used.

As shown in FIGS. 1 and 2, the undercover 1 may have a configuration in which the skin layer 5 on the back side of sound-absorbing material 3 (i.e., the side opposite of the car body side) is bonded to one side of the fiber base material 2 (i.e., the car body side). The fiber base material 2 of the present embodiment may be a fiber molded body containing a thermoplastic synthetic resin and a fiber reinforcement and may have a sheet-shape. The fiber base material 2 may be a non-woven sheet consisting solely of thermoplastic synthetic resin. The fiber base material 2 may be produced by known manufacturing methods, for example, a dry method using needle-punching or a wet method using a paper making method.

The thermoplastic synthetic resin may be, for example, an olefin such as polypropylene, a polyester such as polyethylene terephthalate, or polyamide. The fiber reinforcement may be, for example, glass fibers, basalt fibers, carbon fibers, or natural fibers such as kenaf or bamboo.

An example of the fiber base material 2 is an LWRT fiber base material that includes polypropylene fibers, which is a type of a thermoplastic synthetic resin in this example, used as the binder fibers and glass fibers used as the fiber reinforcement (LWRT=Low Weight Reinforced Thermoplastics). An example of a fiber base material 2 that does not include a fiber reinforcement is a needle-punched nonwoven fabric base material (which is an example of a formed nonwoven fabric) that is made of polyethylene terephthalate fibers and binder fibers such as low-melting-point polyester fibers. These fiber base materials 2 may be multi-layered by laminating nonwoven fabrics or films. The fiber base materials 2 may be formed for flying stone durability and smoothness.

The fiber base material 2 of the undercover 1 is bonded with the sound-absorbing material 3 on the surface where they contact each other. They may be bonded using ultrasonic welding. The fiber base material 2 and the sound-absorbing material 3 may be bonded together by other suitable methods, such as adhesive bonding. By attaching the undercover 1 to a vehicle, the aerodynamic performance of the underside of the vehicle body may be improved, the vehicle may be protected, and the sound absorption performance may be provided. For example, an engine undercover is attached to the underside of the engine without interference between the sound-absorbing material 3 and peripheral components such as heat sources to protect the engine. Further, the engine undercover not only directly absorbs engine noise due to the sound-absorbing material 3, but also absorbs noise from outside the vehicle, such as road noise.

Figure 3:
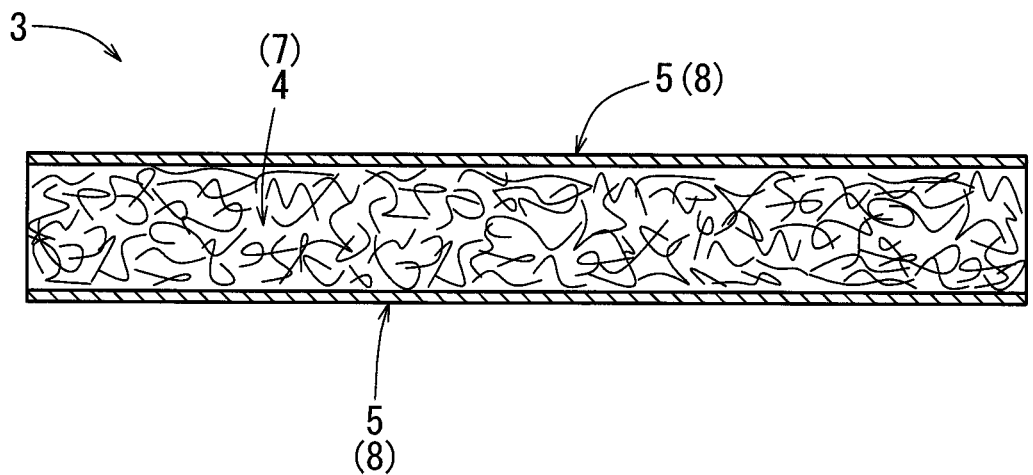
FIG. 3 is a cross-sectional view schematically showing a layered state of an intermediate layer and skin layers before forming of the sound-absorbing material according to the embodiment.
Figure 4:
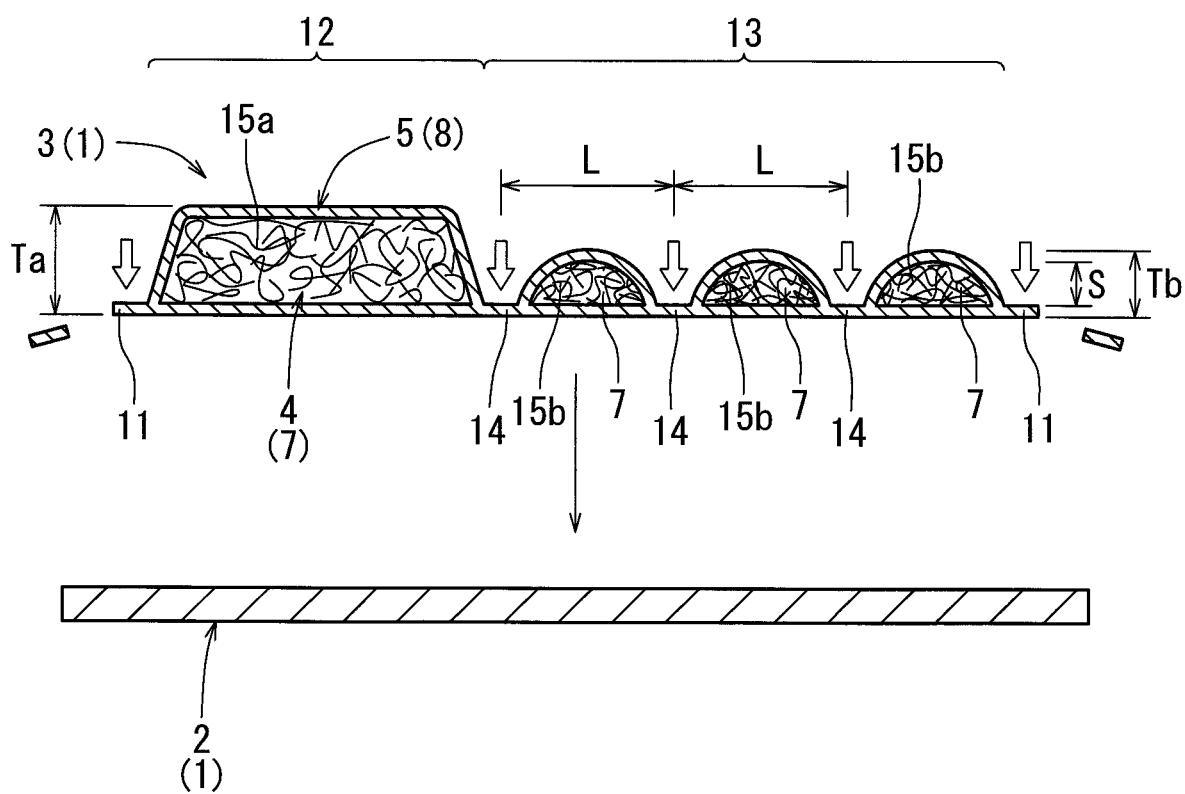
FIG. 4 is a diagram schematically showing a process of forming a crimped portion and a peripheral edge portion of the sound-absorbing material and the process of layering the sound-absorbing material on a fiber base material of the vehicle exterior member according to an embodiment of a manufacturing process of the sound-absorbing material and attachment to the vehicle exterior member.

Next, a method of manufacturing the sound-absorbing material 3 of the present embodiment will be described. As shown in FIGS. 3 and 4, the sound-absorbing material 3 is formed by a forming die (not shown), the sound-absorbing material 3 having a skin layer 5 layered on both sides of an intermediate layer 4. The fiber web 7, which contains entangled thermoplastic synthetic fibers and initially having a sheet-shape, is used for the intermediate layer 4. The nonwoven fabric 8, which contains thermoplastic synthetic fibers and initially has a sheet-shape, is used for the skin layers 5.

At the edge part of the surface of the sound-absorbing material 3, a peripheral edge portion 11 is formed to prevent the fiber web 7 of the intermediate layer 4 from popping out. Specifically, in the state where the intermediate layer 4 and the skin layer 5 are layered, the layered components are compressed in the thickness direction along the peripheral edge by a forming die and heated. A part of the thermoplastic synthetic fibers in the fiber web 7 of the intermediate layer 4 and a part of the thermoplastic synthetic fibers in the nonwoven fabric 8 of the skin layer 5 are thermally melted by the heat. The intermediate layer 4 is integrated with the skin layer 5 by keeping these layers in a squeezed state while they solidify, thereby forming the peripheral edge portion 11. An edge portion outside the peripheral edge portion 11 may be cut during the compression process.

The natural thickness area 12 and the thickness suppression area 13 are provided within the peripheral portion 11 along the surface of the laminated intermediate layer 4 and the skin layer 5. The natural thickness area 12 is an area where the fiber web 7 of the intermediate layer 4 is not substantially compressed, thereby essentially allowing the natural thickness of the intermediate layer 4 to be maintained so that it can function as a sound-absorbing portion 15a. The thickness suppressing area 13 is an area where the fiber web 7 is compressed thinner than the natural thickness in at least a part of the sound-absorbing material 3. This may be done in order to prevent interference between the sound-absorbing material 3 and peripheral components of a portion of an item to which the undercover 1 is to be attached.

A plurality of crimped portions 14 are formed at intervals L within the thickness suppressing area 13 so that the crimped portions 14 are scattered. Specifically, the laminated intermediate layer 4 and skin layer 5 are compressed in the thickness direction by a forming die and heated. A part of the thermoplastic synthetic fibers contained in the fiber web 7 of the intermediate layer 4 and a part of the thermoplastic synthetic fibers contained in the nonwoven fabric 8 of the skin layer 5 are thermally melted in the same manner as that of the peripheral edge portion 11. The intermediate layer 4 and the skin layer 5 are held in a squeezed state while they solidify, thereby integrating these layers. Accordingly, the crimped portions 14 are formed. The arrangement pattern of the crimped portions 14 may be set as needed. For example, crimped portions 14 adjacent to each other may be provided so that they are arranged at the vertices of a triangle. Therefore, the crimped portions 14 may be efficiently arranged in the thickness suppressing area 13. The shape of the crimped portion 14 may be a hexagonal, but other shapes may be appropriate in certain situations. The peripheral edge portion 11 and the crimped portion 14 are formed simultaneously by using the same forming die.

By forming a plurality of crimped portions 14 in the thickness suppressing area 13, a sound-absorbing portion 15b is formed around the crimped portions 14. Specifically, the skin layer 5 around the crimped portion 14 is pulled by the crimped portion 14, which in turn presses the fiber web 7 of the intermediate layer 4. As a result, the sound-absorbing portion 15b, in which the intermediate layer 4 and the skin layer 5 are layered in a state where the fiber web 7 of the intermediate layer 4 is compressed thinner than its natural thickness, is formed.

The maximum thickness of the fiber web 7 in the sound-absorbing portion 15b of the thickness suppressing area 13 (S) may be adjusted by changing the interval (L) between the crimped portions 14. For example, when the interval between the crimped portions 14 (L) is narrowed, the force by which the skin layer 5 is being pulled by the crimped portions 14 and the pressing of the fiber web 7 of the intermediate layer 4 increases per unit area. Therefore, the ratio of compression of the fiber web 7 in the sound-absorbing section 15b is also increased. Thus, the maximum thickness of the fiber web 7 (S) becomes thinner. On the other hand, when the interval between the crimped portions 14 (L) is widened, the force by which the skin layer 5 presses the fiber web 7 becomes relatively small. Therefore, the ratio of compression of the fiber web 7 is decreased. In this way, the number of crimped portions 14 and the interval (L) between the crimped portions 14 may be adjusted according to the required size and thickness (Tb) of the thickness suppression area 13.

Further, in the thickness suppressing area 13, the crimped portions 14 may be dispersed at a constant interval (L). Thereby, the force by which the skin layer 5 around the crimped portions 14 presses the fiber web 7 becomes constant. Thus, the maximum thickness of the fiber web 7 (S) in the thickness suppressing area 13 may be made constant. The thickness of the sound-absorbing portion 15b may also be made uniform. As a result, an unevenness in the thickness of the sound-absorbing material 3 (Tb) in the thickness suppressing area 13 may be reduced.

As described above, the step of forming the peripheral edge portion 11, which is heat-compressed, by compressing the sound-absorbing material 3 in the thickness direction along the peripheral edge in a state where the intermediate layer 4 and the skin layer 5 are layered corresponds to an embodiment of the "peripheral edge portion forming step" of the present disclosure. The step of forming a plurality of the crimped portions 14, which is heat-compressed, at an interval (L) by compressing the intermediate layer 4 and the skin layer 5 in the thickness direction in the thickness suppression area 13 within the peripheral edge portion 11 corresponds to an embodiment of the "crimped portion forming step" of the present disclosure. Since the peripheral edge portion 11 and the crimped portion 14 may be formed simultaneously using the same forming die, the crimped portion forming step and the peripheral edge forming step may be capable of being performed at the same time.

It is possible to obtain a sound-absorbing material 3 having a partially varied thickness using the manufacturing steps of the sound-absorbing material 3 according to the present embodiment. As shown in FIG. 4, the sound-absorbing material 3 is bonded to a surface of a car body side of a fiber base material 2 of an undercover 1. For example, the sound-absorbing material 3 and the fiber base material 2 may be bonded by ultrasonic welding. However, they may instead be bonded together by other methods, such as adhesive bonding.

According to the sound-absorbing material 3 of the present embodiment, an intermediate layer 4, which is made of a fiber web 7, and a skin layer 5, which is made of a nonwoven fabric 8 layered on both sides of the intermediate layer 4, may contain thermoplastic synthetic fibers. Further, the sound-absorbing material 3 may include the peripheral edge portion 11 and the crimped portion 14 where the intermediate layer 4 and the skin layer 5 are heat-compressed in the thickness direction. A plurality of crimped portions 14 are provided at one or more interval (L) on at least a part of the surface of the skin layer 5 laminated with the intermediate layer 4 and within the peripheral edge portion 11. The skin layer 5 around the crimped portion 14 is pulled by the crimped portion 14 and presses the fiber web 7 of the intermediate layer 4. Thereby, a sound-absorbing portion 15b, in which the fiber web 7 is compressed thinner than the original thickness (which is the natural thickness) of the intermediate layer 4, is formed in the area where the crimped portions 14 are provided. Therefore, it is possible to reduce the thickness (Tb) of the sound-absorbing layer 3 in an area where it is necessary to prevent interference with peripheral components. Further, the basis weight of the thinner sound-absorbing portion 15b of the sound-absorbing material 3 is greater than that of a conventional thinner sound-absorbing portion, which has a low basis weight sound-absorbing material with a thin natural thickness that is not compressed. As a result, it is possible to suppress a decline in sound absorption performance of the sound-absorbing material 3.

In the sound-absorbing material 3, since the crimped portions 14 are scattered over the thickness suppressing area 13 along the surface of the skin layer 5 laminated with the intermediate layer 4, the sound-absorbing material 3 has a smaller deviation in the thickness of the sound-absorbing portion 15b. Therefore, the thickness of the sound-absorbing material 3 (Tb) may be adjusted more consistently.

The sound-absorbing material 3 has a plurality of crimped portions 14 at a constant interval (L) in the thickness suppression area 13. Therefore, between adjacent crimped portions 14, the force by which the skin layer 5 is being pulled by the crimped portion 14 to press down on the fiber web 7 of the intermediate layer 4 may be also constant. Since the fiber web 7 is compressed to a constant maximum thickness (S), the thickness of the sound-absorbing portion 15b may be made uniform. As a result, unevenness in the thickness (Tb) of the sound-absorbing material 3 may be reduced in the thickness suppression area 13.

The undercover 1 (which is an example of a vehicle exterior member) may include a sound-absorbing material 3 in which its thickness (Tb) is reduced by providing the crimped portions 14. Thereby, the spacing between the sound-absorbing material 3 and peripheral components is maintained above a certain distance. As a result, contact between the sound-absorbing material 3 and components peripheral to the undercover 1, for example a heat source of an engine, may be prevented.

In the manufacturing step of sound-absorbing material 3, the intermediate layer 4, which includes a fiber web 7, and the skin layer 5, which includes a nonwoven fabric 8 layered on both sides of the intermediate layer 4, are compressed and heated in the thickness direction. Accordingly, a part of the thermoplastic synthetic fibers contained in these layers are thermally melted. Thereby, the peripheral edge portion 11 and the crimped portion 14, both portions of which the intermediate layer 4 and the skin layer 5 are heat-compressed, are formed. Accordingly, a plurality of crimped portions 14 are provided at one or more interval (L) on the surface of the skin layer 5 laminated with the intermediate layer 4 in at least a part of the sound-absorbing material 3 near the peripheral edge portion 11. Therefore, the skin layer 5 around the crimped portions 14 is pulled by the crimped portions 14 and presses the fiber web 7 of the intermediate layer 4. As a result, the sound-absorbing portion 15b in which the fiber web 7 is compressed thinner than its original thickness (which is the natural thickness) is formed in the area where the crimped portions 14 are provided. Therefore, it is possible to reduce the thickness (Tb) of at least a part of the sound-absorbing material 3 where is necessary to prevent interference between peripheral components and the single sound-absorbing material 3. Further, the basis weight of the sound-absorbing material 3 in the sound-absorbing portion 15b is greater than that of a conventional low basis weight sound-absorbing material having a thin natural thickness that is not compressed. Therefore, it is possible to suppress a decline in sound absorption performance of the sound-absorbing material 3.

In a manufacturing step of the sound-absorbing material 3, heat-compression is used for forming the crimped portions 14 along the surface of the skin layer 5 laminated with the intermediate layer 4 (i.e., the crimped portion forming step). Heat-compression is also used for forming the peripheral edge portion 11 that prevents the fiber web 7 of the intermediate layer 4 from popping out (i.e., the peripheral edge portion forming step). These heat-compression steps may be performed simultaneously. Therefore, a sound-absorbing material 3 with a controlled thickness can be formed without increasing the number of man-hours.

In the crimped portion forming step, the sound-absorbing portion 15b may be formed with a thickness corresponding to an interval (L) of the crimped portions 14 by setting each interval (L) between the crimped portions 14 formed in the thickness suppression area 13. For example, when the interval (L) between crimped portions 14 is set narrower, the force by which the skin layer 5 is being pulled by the crimped portions 14 to press down on the fiber web 7 of the intermediate layer 4 per unit area becomes greater. Therefore, the maximum thickness (S) of the fiber web 7 in this portion of the sound-absorbing portion 15b becomes thinner. In this way, the thickness (Tb) of the sound-absorbing material 3 may be adjusted by varying the interval (L) between the crimped portions 14.

In the crimped portion forming step, a plurality of crimped portions 14 are provided in the thickness suppressing area 13 at a constant interval (L). Thereby, the force by which the skin layer 5 is being pulled by the crimped portions 14 and the pressing of the fiber web 7 of the intermediate layer 4 becomes constant between the adjacent crimped portions 14. Therefore, the fiber web 7 is compressed so that the maximum thickness (S) becomes constant. Thus, the thicknesses of this sound-absorbing portion 15b may be made uniform. As a result, unevenness in the thickness (Tb) of the sound-absorbing material 3 may be reduced in the thickness suppressing area 13.

By forming the sound-absorbing material 3 with partially different thickness, the number of parts for the sound-absorbing material 3 and the number of man-hours required for attaching the material may be reduced as compared to attaching multiple sound-absorbing materials with different thicknesses to a vehicle exterior member. Therefore, it is possible to improve both the efficiency of the manufacturing and attachment of the sound-absorbing material 3 and the undercover 1.

Hereinafter, the present disclosure will be specifically described according to an embodiment and a comparative example.

Now, a First Embodiment will be described. As a fiber base material 2 of the undercover 1, an undercover material (basis weight of 1400 gsm) for a vehicle is used. The fiber base material 2 is a multi-layer fiber base material in which a needle-punched nonwoven fabric is bonded to a fiber base material. This is made by needle punching glass fibers with polypropylene fibers. The fiber base material 2 is formed into a plate-shape having a thickness of 7 mm. As the sound-absorbing material 3 attached to the undercover 1, Thinsulate TF2300 (which has a thickness of approximately 27 mm, and a basis weight of 232 gsm) manufactured by 3M is used. The original thickness (which is the natural thickness) of the sound-absorbing material 3 is approximately 27 mm. In the thickness suppressing area 13 of the sound-absorbing material 3, circular crimped portions 14 having a diameter of 10 mm are provided at an interval of 50 mm. Thereby, the thickness of the sound-absorbing material 3 in the thickness suppressing area 13 is compressed to a thickness of approximately 13 mm.

Next, a Comparative Example 1 will be described. As the fiber base material of the undercover, the same material as that of the First Embodiment is used. As a sound-absorbing material, Thinsulate TF1500 (which has a thickness of approximately 16 mm, and a basis weight of 150 gsm) manufactured by 3M is used, instead of the sound-absorbing material of the First Embodiment. Assuming a state where the sound-absorbing material has a natural thickness of approximately 16 mm and peripheral components are interfered with, the fiber base material of the undercover (thickness of 7 mm) is layered on the sound-absorbing material so that the material is pressed in the thickness direction. Thereby, the portion of the sound-absorbing material of Comparative Example 1 in contact with the peripheral components is compressed to a thickness of approximately 13 mm.

Figure 5:
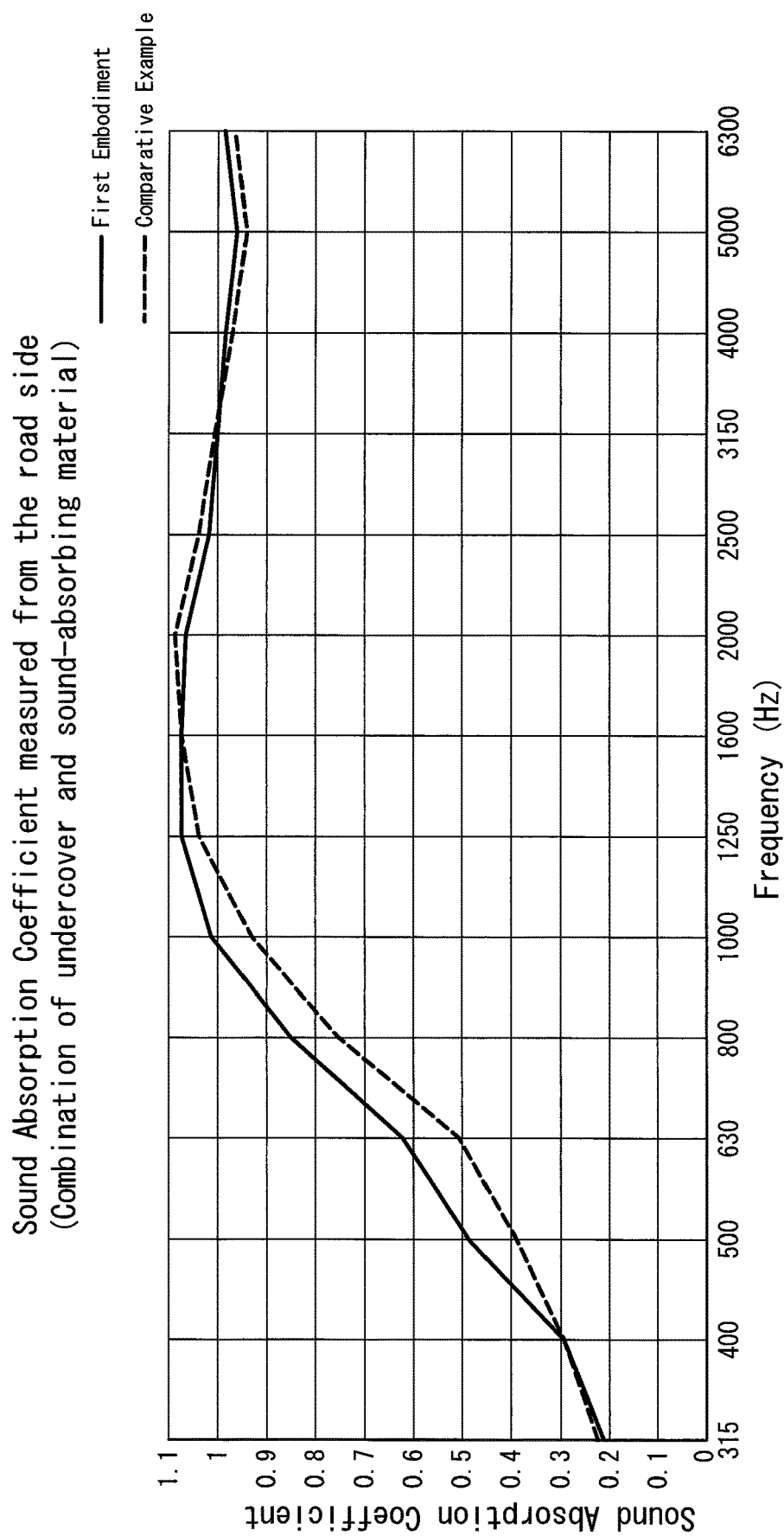
FIG. 5 is a diagram showing the sound absorption performance of the sound-absorbing material according to an embodiment and a comparative example.

The sound absorption coefficient of the undercovers made according to the First Embodiment and the Comparative Example 1 were measured from the fiber base material side, i.e., from the road surface side, and compared. The sound absorption coefficient of this test measures the performance of the sound-absorption of road noise from the road surface side of the layered fiber base and sound-absorbing materials. The sound absorption coefficient was measured by a reverberant sound absorption coefficient according to the standard of JIS A 1409. Because the sound-absorbing material is soft, the distance from the floor to the surface of the fiber base material was set to 20 mm by placing spacers as appropriate. FIG. 5 shows the respective sound absorption coefficients of the First Embodiment and the Comparative Example 1. As seen in FIG. 5, the sound absorption coefficient of the First Embodiment for each frequency within the frequency range of 315-6300 Hz changes with the same tendency as that of the Comparative Example 1. The First Embodiment shows a higher sound absorption coefficient than the Comparative Example 1 in the frequency range of 400-1600 Hz. The First Embodiment and the Comparative Example 1 show almost the same sound absorption coefficient in the frequency range of 1600-6300 Hz. Thus, a significant decrease in the sound-absorbing performance of the sound-absorbing member according to the First Embodiment is suppressed as compared to the Comparative Example 1.

The sound-absorbing member and the vehicle exterior member of the present disclosure are not limited to the appearance and configuration described in the above embodiment, and can be implemented in various other forms by various changes, additions, deletions, and/or combinations of configurations to the extent that the gist of the invention is not changed.

The vehicle exterior member of the present disclosure is not limited to an engine undercover and a floor undercover, but may instead be applied to other exterior products for forming the vehicle exterior member. For example, it may be applied to other undercovers attached to under the vehicle floor, an engine side cover, a wheelhouse protector, etc.

The shape of the crimped portion 14 of the sound-absorbing material 3 is not limited to a hexagonal shape, but may be changed to other shapes, for example, a circle, ellipse, or square, as needed.

A plurality of thickness suppression areas 13 with different thicknesses of the sound-absorbing material 3 may be provided, for instance depending on the location and application of the vehicle exterior member. For example, a first thickness suppression area with a wide interval between the crimped portions 14 and a second thickness suppression area 13 with a narrow interval between the crimped portions 14 may be provided. Further, the sound-absorbing material 3 may be configured such that the natural thickness area 12 may not be provided, and instead only the thickness suppression area 13 may be provided.

The sound-absorbing material 3 may be configured with the skin layer 5 layered only on one side of the intermediate layer 4, e.g., the side opposite the side in contact with the fiber base material 2. The configuration may depend on the application of the vehicle exterior member, for instance based on the area to which it is to be attached.

A second aspect of the present disclosure is a sound-absorbing material according to the first aspect, wherein the crimped portions are scattered on the surface of the intermediate layer laminated with the skin layer.

According to the second aspect, the crimped portions are scattered over the area where the thickness is suppressed on the surface of the intermediate layer laminated with the skin layer. Thus, the sound-absorbing material has a smaller deviation in the thickness of the sound-absorbing portions. Thus, the thickness of the sound-absorbing material can be adjusted more consistently.

A third aspect of the present disclosure is a sound-absorbing material according to the second aspect, wherein the sound-absorbing portion is provided with a plurality of crimped portions separated by a constant interval on the surface of the intermediate layer laminated with the skin layer. Therefore, the maximum thickness of the fiber web is a constant thickness.

According to the third aspect, the sound-absorbing material may have a plurality of crimped portions at a constant interval. Therefore, between adjacent crimped portions, the force by which the skin layer is being pulled by the crimped portions to press down the fiber web of the intermediate layer may be also constant. The maximum thickness of the fiber web is compressed to a certain thickness. The thickness of the sound-absorbing portion can be made uniform. Therefore, it is possible to reduce an unevenness of thickness of the sound-absorbing material in the area where the crimped portions are provided.

A fourth aspect of the present disclosure is a vehicle exterior member, which may include a fiber base material containing a thermoplastic synthetic resin and a sound-absorbing material according to any one of the first to the third aspects.

According to the fourth aspect, the vehicle exterior member may include the sound-absorbing material which is adjusted to have a thickness to be thinner by providing the crimped portion. Therefore, a gap between the sound-absorbing material and peripheral parts are maintained above a certain distance. As a result, interference between the sound-absorbing material and the peripheral parts of the vehicle exterior member can be prevented.

A fifth aspect of the present disclosure is a method of manufacturing a sound-absorbing material to be attached to a vehicle exterior member. The sound-absorbing material may include a peripheral edge portion forming process and a crimped portion forming process. In the peripheral edge portion forming process, the peripheral edge portion may be heat-compress bonded in a state where an intermediate layer and a skin layer are layered and compressed in the thickness direction along the peripheral edge. The intermediate layer may be a fiber web of entangled thermoplastic synthetic fibers and may have a sheet-shape. The skin layer is a planar nonwoven fabric containing thermoplastic synthetic fibers laminated with at least one surface of the intermediate layer. In the crimped portion forming step, a plurality of crimped portions are formed at one or more interval on at least a part of the surface of the intermediate layer laminated with the skin layer and within the peripheral edge portion. The intermediate layer and the skin layer are heated in a compressed state in the thickness direction to form the crimped portions. The laminated intermediate layer and skin layer are in a state where the fiber web is compressed thinner than its natural thickness between and by the crimped portion.

According to the fifth aspect, by compressing and heating the intermediate layer, which is a fiber web, and the skin layer, which is a non-woven fabric, in the thickness direction, a part of the thermoplastic synthetic fibers contained therein are melted. Thereby, the peripheral edge portion and the crimped portion, in which the intermediate layer and the skin layer are heat-compress bonded, are formed. A plurality of crimped portions is provided at one or more interval along at least a part of the surface of the intermediate layer laminated with the skin layer and positioned inward of the peripheral edge portion. Thereby, the skin layer around the crimped portions is pulled by the crimped portion, which causes the skin layer to press the fiber web of the intermediate layer. The sound-absorbing portion, in which the fiber web is compressed thinner than its original thickness, is formed in the area where the crimped portions are provided. Therefore, the thickness of some areas in a single sound-absorbing material, in areas where there is need to prevent the sound-absorbing material from interfering with surrounding parts, can be made thinner. Further, the basis weight of the sound-absorbing material in the sound-absorbing portion can be greater than that of a conventional low basis weight sound-absorbing material with a thin natural thickness that has not been compressed. Therefore, it is possible to suppress a decline in sound absorption performance of the sound-absorbing material in a thinner area.

A sixth aspect of the present disclosure is a method of manufacturing a sound-absorbing material, wherein the peripheral edge portion forming process and the crimped portion forming process are performed simultaneously.

According to the sixth aspect, heat-compression for forming the crimped portion on the surface of the intermediate layer laminated with the skin layer and heat-compression for forming the peripheral edge portion to prevent the fiber web of the intermediate layer from popping out may be performed simultaneously. Therefore, a sound-absorbing material with controlled thickness can be formed without increasing the number of man-hours.

A seventh aspect of the present disclosure is a method of manufacturing a sound-absorbing material, wherein the thickness of the fiber web of the sound-absorbing portion is adjusted by varying the interval between the crimped portions.

According to the seventh aspect, the sound-absorbing portion is formed to a thickness corresponding to the interval between the crimped portions by setting the interval between the plurality of crimped portions as desired. When the interval between the crimped portions is set narrower, the force by which the skin layer is being pulled by the crimped portions to cause the skin layer to press down on the fiber web of the intermediate layer per unit area becomes greater. Therefore, the thickness of the fiber web of the sound-absorbing portion becomes thinner. In this way, the thickness of the sound-absorbing material can be adjusted by varying the interval between the crimped portions.

The configuration and/or steps of the present disclosure may result in a sound-absorbing material in which the sound-absorbing performance is maintained while the thickness of a predetermined area can be varied as required, a vehicle exterior member using the sound-absorbing material, and a method for manufacturing the sound-absorbing material.

The various examples described above in detail with reference to the attached drawings are intended to be representative of the present disclosure and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide a sound-absorbing material, vehicle exterior member using same, method of manufacturing same, and/or methods of using the same.

What is claimed is:

1. A sound-absorbing material attached to a vehicle exterior member, comprising:
   an intermediate layer made of a fiber web of entangled thermoplastic synthetic fibers;
   a skin layer made of a nonwoven fabric containing thermoplastic synthetic fibers, the skin layer being laminated with at least one surface of the intermediate layer;
   a peripheral edge portion in which a portion of a peripheral edge of the intermediate layer is heat-compress bonded with a portion of a peripheral edge of the skin layer;
   crimped portions in which the intermediate layer and the skin layer are heat-compress bonded, each of the crimped portions being spaced apart from each other and from the peripheral edge portion; and
   a sound-absorbing portion positioned between a first and second crimped portion of the crimped portions and in which the intermediate layer and the skin layer are laminated, wherein:
   the sound-absorbing portion has a thickness suppression area where a portion of the fiber web of the sound-absorbing area is compressed thinner than its natural thickness by the skin layer between the first and second crimped portions, the natural thickness of the fiber web being a thickness of the fiber web in an uncompressed state; and
   the thickness of the sound-absorbing portion is adjusted by having a plurality of different thicknesses by varying an interval of the crimped portions scattered over the area and includes a thickness suppression area with a relatively wide interval of the crimped portions and a thickness suppression area with a relatively narrow interval of the crimped portions.

2. The sound-absorbing material according to claim 1, wherein a maximum thickness of the fiber web in the sound-absorbing portion is thinner than the natural thickness of the fiber web.

3. The sound-absorbing material according to claim 2, further comprising a third crimped portion of the crimped portions positioned from the second crimped portion by the same distance that the first crimped portion is positioned from the second crimped portion, wherein the maximum thickness of the fiber web of the sound-absorbing portion between the first and second crimped portions is the same as a maximum thickness between the second and third crimped portion.

4. A vehicle exterior member, comprising:
   a fiber base material containing a thermoplastic synthetic resin; and
   the sound-absorbing material according to claim 1 bonded to the fiber base material.

5. A method of manufacturing a sound-absorbing material attached to a vehicle exterior member, comprising the steps of:
   forming a peripheral edge portion by heat-compress bonding a lamination of an intermediate layer, which comprises a fiber web of entangled thermoplastic synthetic fibers, and a skin layer, which comprises a nonwoven fabric containing thermoplastic synthetic fibers, in the thickness direction along a peripheral edge of the lamination; and
   forming a plurality of crimped portions on at least a part of the surface of the laminated intermediate layer and the skin layer by heat-compress bonding the intermediate layer and the skin layer in the thickness direction at a position away from the peripheral edge portion, wherein:
   each of the plurality of crimped portions is positioned such that the fiber web in an area of and positioned between the plurality of crimped portions is compressed thinner than a natural thickness of the fiber web, the natural thickness of the fiber web being a thickness of the fiber web in an uncompressed state and
   the thickness of the sound-absorbing portion is adjusted by having a plurality of different thicknesses by varying an interval of the crimped portions scattered over the area and includes a thickness suppression area with a relatively wide interval of the crimped portions and a thickness suppression area with a relatively narrow interval of the crimped portions.

6. The method of manufacturing the sound-absorbing material according to claim 5, wherein the step of forming the peripheral edge portion and the step of forming the crimped portion are performed simultaneously.

7. The method of manufacturing the sound-absorbing material according to claim 5, wherein a thickness of the fiber web in the area of the plurality of crimped portions is thinner when the crimped portions are formed closer together.

8. The sound-absorbing material according to claim 1, wherein a spacing between each of the crimped portions is constant.

9. The sound-absorbing material according to claim 1, wherein a thinness of the fiber web between the first and second crimped portions, which are distanced apart from each other by a first distance, is thinner than the fiber web between another two crimped portions distanced apart from each other by a second distance larger than the first distance.

10. The method of manufacturing the sound-absorbing material according to claim 5, wherein a thinness of the fiber web is set in the area of the plurality of crimped portions based on the spacing between adjacent crimped portions of the plurality of crimped portions.

* * * * *